UNITED STATES PATENT OFFICE.

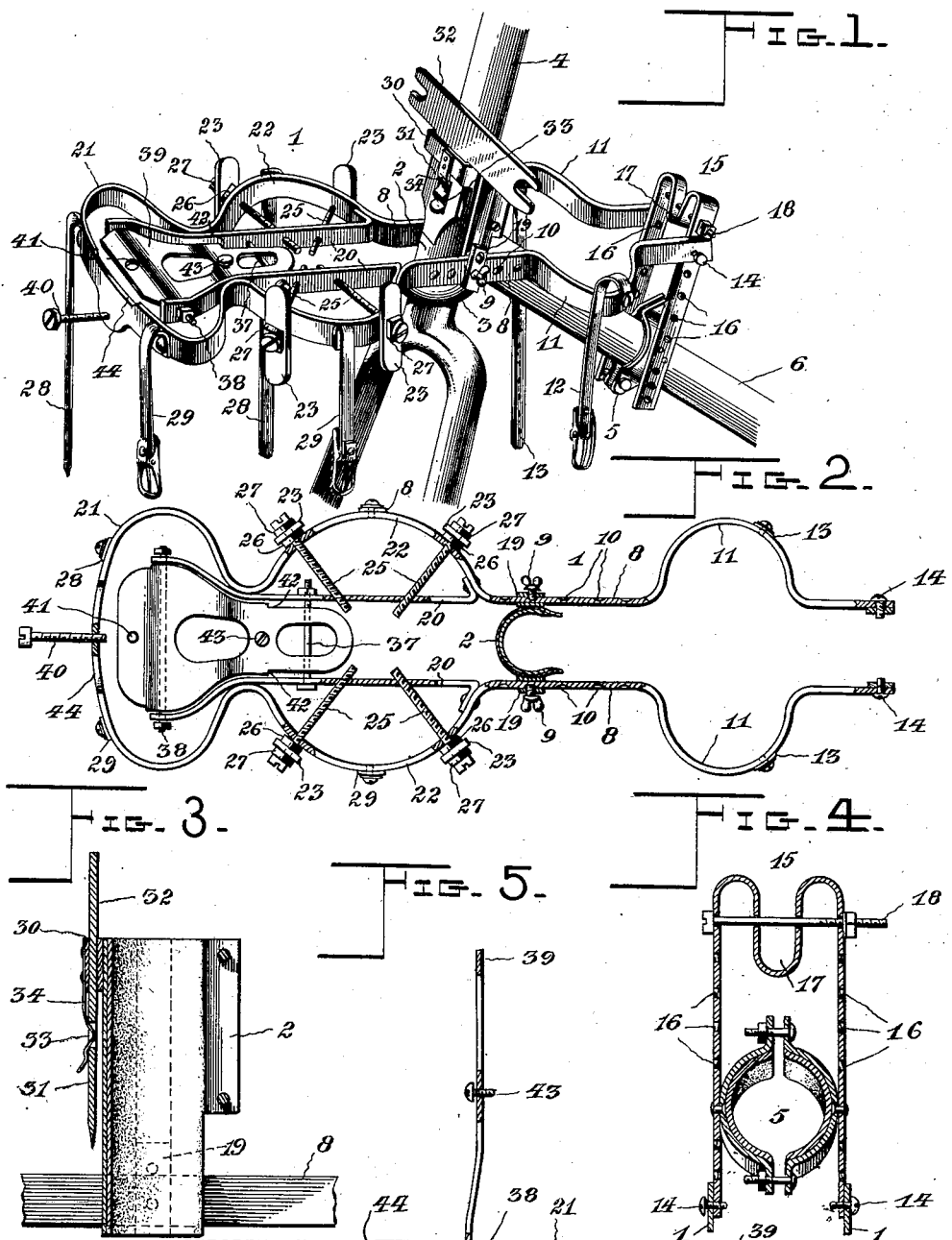

IRA D. ALDERMAN, OF WAYCROSS, NORTH CAROLINA.

LUGGAGE-CARRIER FOR BICYCLES.

SPECIFICATION forming part of Letters Patent No. 628,294, dated July 4, 1899.

Application filed March 17, 1899. Serial No. 709,485. (No model.)

*To all whom it may concern:*

Be it known that I, IRA D. ALDERMAN, a citizen of the United States, residing at Waycross, in the county of Sampson and State of North Carolina, have invented a new and useful Luggage-Carrier for Bicycles, of which the following is a specification.

The invention relates to improvements in luggage-carriers for bicycles.

The object of the present invention is to improve the construction of luggage-carriers for bicycles and to provide a simple and comparatively inexpensive one, capable of ready adjustment to enable it to be readily applied to any ordinary bicycle and also to suit the character of the bundle or other luggage to be carried.

A further object of the invention is to provide a luggage-carrier adapted to support a lamp in order to enable the latter to be arranged out of the way, so that it will not interfere with large or high bundles which could not be carried were the lamp arranged adjacent to the handle-bars in the ordinary manner.

Another object of the invention is to enable the lamp-carrier to be folded out of the way when it is not in use and also to be arranged to increase the length of the frame of the luggage-carrier to adapt the latter for long packages.

The invention also has for its object to provide a luggage-carrier which will be capable of firmly clamping the bottom of a bucket or analogous receptacle in order that the same may be securely held on it in an upright position.

The invention consists in the construction and novel combination and arrangement of parts hereinafter fully described, illustrated in the accompanying drawings, and pointed out in the claims hereto appended.

In the drawings, Figure 1 is a perspective view of a luggage-carrier constructed in accordance with this invention and shown applied to the front portion of a bicycle-frame. Fig. 2 is a horizontal sectional view. Fig. 3 is a vertical sectional view of the main clamp, illustrating the manner of mounting the removable back or support to enable the same to be used as a tool. Fig. 4 is a transverse sectional view of the rear or inner end of the luggage-carrier, illustrating the construction of the rear clamp. Fig. 5 is a vertical longitudinal sectional view of the front end of the luggage-carrier, showing the lamp-carrier in operative position in full lines and folded and extended in dotted lines.

Like numerals of reference designate corresponding parts in all the figures of the drawings.

1 designates a luggage-carrier frame, adjustably secured between its ends to a front or main clamp 2, which is adapted to be secured to the front tube of a bicycle-frame above the front fork and to rest upon the bead or rim 3 at the bottom of the front tube 4, whereby the luggage-carrier is firmly supported and is adapted to sustain the weight of heavy luggage. The rear end of the frame is secured to a clamp 5, which engages the inclined bottom bar 6 of the frame of the bicycle and which enables the said rear end of the luggage-carrier frame to be adjusted vertically to elevate and depress the front portion thereof and enable the same to be arranged in the desired position above the front wheel, and by arranging the frame of the luggage-carrier in this position it is adapted to support a bundle or other package both in front and in rear of the main clamp 2.

The luggage-carrier frame is composed of two sides, forming a space or longitudinal opening between them, and provided with intermediate straight portions 8, which are adjustably connected to the main or front clamp at opposite sides thereof by set-screws 9, having winged heads and adapted to engage depressions or sockets 10, formed in the outer faces of the intermediate straight portions 8. The sides are provided at points between their rear ends and the intermediate portions 8 with lateral extensions 11, preferably consisting of curved bends, and adapted to afford a broad base or support for a bundle or other package and provided with straps 12 and 13 for securing the same in place. The rear ends of the sides of the frame are straight and parallel and are adjustably secured by screws 14 or other suitable devices to a resilient yoke or spring 15, having parallel sides secured to the jaws of the rear clamp. The jaws of the rear clamp are connected by suitable fastening devices, and the parallel sides of the resilient yoke or spring are provided at intervals with threaded perforations 16 to receive the screws of the rear end of the sides of the luggage-carrier frame, and these perforations permit the rear end of the frame of the device to be secured at the desired elevation, and when the rear clamp is detached from the frame of the device the latter may be readily introduced on the frame of a bicycle. The rear clamp, which is designed to be of a size to engage tubing of the smaller diameter employed in bicycles, may be adjusted by means of the resilient yoke or frame to clamp tubing of greater diameter, and this result is effected by means of a substantially U-shaped bend 17, connecting the upper ends of the sides of the resilient yoke or frame and adapted to permit the said sides to be spread to the desired extent. The upper terminals of the sides of the yoke or spring and the sides of the U-shaped bend are perforated for the reception of a transverse bolt 18, which retains the yoke or spring at the desired adjustment and which may also be employed for supporting the rear ends of the sides of the frame 1 should it be desired to adjust the same to that extent. The front or main clamp is resilient and is provided with suitable fastening devices for connecting its jaws or sides, and it is provided at its bottom, at opposite sides, with ears or plates 19, spaced from it, to receive the straight intermediate portions 8 of the frame 1 and forming supports for the set-screws 9. The ears or plates have threaded perforations to receive the screws 9, which form pivots or fulcrums for the frame 1.

The front portion of the frame 1 is composed of central longitudinal bars 20 and outer segmental extensions 21 and 22, preferably formed integral with the straight intermediate portions 8, which are extended and looped around the bars 20, as shown; but the frame may be constructed in any other suitable manner. The segmental extensions 22, which are located immediately in front of the main clamp, form a circular support which is adapted to receive the bottom of a bucket or analogous receptacle, and clamping-jaws 23 are provided for engaging the same.

The clamping-jaws 23, which may be of any desired number, are preferably arranged in pairs at each side, as shown, and are mounted on radial screws 25, engaging threaded perforations of the extension 22 and the central bars 20 and adapted to be adjusted to move them inward and outward. The jaws 23, which project above the frame 1 when in use, are engaged by inner and outer nuts 26 and 27 and are firmly held at any desired adjustment. Should it be desired to clamp a receptacle of less diameter than the circle formed by the segmental extensions 22, the clamping-jaws 23 may be arranged in the spaces between the same and the bars or portions 20. When the clamping-jaws 23 are not in use, they may be turned down to a horizontal position, and their upper edges will then be flush with the upper edges of the frame 1.

The front segmental extensions 21 increase the width of the front end of the frame 1, and the extensions 21 and 22 are provided with straps 28 and 29, adapted to be passed around a bundle or other luggage.

In order to prevent a bundle or other package from slipping laterally around the front tube of the bicycle-frame, the front or main clamp is provided with a loop or keeper 30, adapted to receive a depending stem or portion 31 of a support 32, which forms a back for the luggage-carrier. The support 32, which is preferably T-shaped, as shown, is provided in its depending portion or stem with an opening 33, which is engaged by a catch 34, depending from the loop or keeper 30, and provided with a bend forming a tooth or projection adapted to enter the said opening. This opening 33 forms a nut-receiving socket, and the laterally-extending arms of the support 32 are preferably provided with nut-receiving recesses of different sizes, and the depending arm or portion of the support is shaped into a screw-driver blade. By this construction the support forms a convenient tool and may be readily detached when it is desired to adjust the parts of the luggage-carrier, and it may of course be conveniently employed for operating on a bicycle.

The portions or bars 20 are connected by a transverse bolt or pin 37, and their front ends are diverged, as shown, and are perforated for the reception of a bolt or pintle 38 of a hinged lamp-carrier 39, constructed of sheet metal and adapted, when not in use, to be folded within the frame 1, as clearly illustrated in Figs. 1 and 2 of the accompanying drawings. The lamp-carrier, which tapers toward its upper end, is supported in its folded position by the transverse pin or bolt 37, and it is maintained in an elevated position for holding a lamp by means of a screw 40, mounted in a threaded perforation of the front of the luggage-carrier frame and engaging a threaded perforation 41 of the base of the lamp-carrier. The upper end of the lamp-carrier is reduced to form shoulders 42 and is provided with a fastening device 43, projecting beyond it and adapted to form a stop for the clamp or bracket of a lamp. When it is desired to increase the length of the frame 1 to adapt it for large bundles and packages, the lamp-carrier may be swung forward to the extended position illustrated in dotted lines in Fig. 5 of the accompanying drawings, and the front of the frame 1 is provided with a recess 44, adapted to permit the lamp-carrier to be arranged flush with the upper edges of the adjacent portions of the frame. The lamp-bracket is provided at opposite sides with perforated ears for the reception of the transverse bolt or pintle which passes through the diverging front ends of the bars or portions 20; but instead of mounting the lamp-carrier in this manner it may be hinged in any other desired way.

The lamp-bracket is located at the outer end of the frame 1 and may be arranged at any desired inclination, and by locating a lamp at this point large bundles may be carried without interfering with it, and there is no liability of any oil leaking upon the package carried.

The invention has the following advantages: The luggage-carrier, which is simple and comparatively inexpensive in construction, possesses great strength and durability, and it may be readily mounted on any bicycle and adjusted to suit the same. The frame of the luggage-carrier is capable of longitudinal adjustment to extend it the desired distance in front of the bicycle, and thereby adapt it for carrying bundles of different sizes, and it is also capable of receiving a bundle both in front and in rear of the main clamp. The rear clamp, which is adjustable on the inclined bottom bar of the frame of the bicycle, is adapted to be moved forward and rearward, and the sides of the resilient yoke or spring permit the rear end of the frame to be raised and lowered to elevate and depress the front portion of the frame; also, the U-shaped bend of the yoke or frame permits the sides to be adjusted laterally to adapt the clamp for engaging bars or tubes of different diameters. The front circular portion of the frame is adapted to form a seat for a bucket or analogous receptacle, and the adjustable clamping-jaws are adapted to engage the same and hold it securely on the said seat. These clamping-jaws may be turned down out of the way when it is not desired to use them, and they may be arranged at the inner and outer sides of the segmental extensions 22 to adapt them for clamping receptacles of different diameters. The removable back, which supports the packages or bundles to prevent them from slipping around the front tube of the bicycle-frame, forms a convenient tool for adjusting the parts of the device, and the opening, which forms a nut-socket, is also adapted to receive the projecting portion of the catch, which locks the removable back or support in the keeper of the main clamp. The lamp-carrier, which is located at the front of the frame 1, is adapted to be folded within the same when it is not in use, and it is capable of being arranged in an upright position for the reception of an ordinary bicycle-lamp, and it holds the same so that none of the oil can come in contact with a bundle or package; also, the lamp-carrier may be swung forward to increase the length of the frame 1 and adapt the luggage-carrier for the reception of bulky packages.

Changes in the form, proportion, and minor details of construction may be resorted to without departing from the spirit or sacrificing any of the advantages of this invention.

What is claimed is—

1. The combination with a bicycle-frame, of a luggage-carrier comprising a front clamp mounted on the front fork of the bicycle-frame, a rear clamp mounted on the frame in rear of the front fork, and a luggage-carrier frame fulcrumed on the front clamp and adjustably secured to the rear clamp, whereby its rear portion may be raised and lowered, said luggage-carrier having bundle-receiving portions located in front and in rear of the front fork, substantially as described.

2. The combination with a bicycle-frame, of a luggage-carrier comprising a front clamp mounted on the front fork, a rear clamp mounted on the frame in rear of the front fork, and a luggage-carrier frame fulcrumed on the front clamp and having its rear portion capable of vertical adjustment on the rear clamp, said luggage-carrier frame being also capable of longitudinal adjustment on the front clamp to vary the length of the front and rear package-receiving portions, substantially as described.

3. A luggage-carrier comprising a luggage-carrier frame provided with means for securing it to the front portion of the frame of a bicycle and adapted to project forward therefrom, and a lamp-carrier arranged at the front of the frame and adapted to fold inward on the same when not in use and capable of swinging outward and increasing the length of the frame to adapt the luggage-carrier for large packages, substantially as described.

4. A luggage-carrier comprising a frame, means for securing the frame to the front of a bicycle, and a removable support or back arranged to receive a bundle to prevent the same from slipping around the front of the frame of the bicycle, said back or support being adapted to be used as a tool when detached, substantially as described.

5. A luggage-carrier comprising a frame provided with a circular seat and having threaded openings, screws engaging the threaded openings, jaws mounted on the screws and projecting above the frame to engage a bucket or receptacle placed on the seat, and means for securing the frame to a bicycle, substantially as described.

6. A luggage-carrier comprising a frame provided with means for attaching it to a bicycle and having a seat adapted to receive a receptacle, jaws arranged at the seat for engaging the receptacle, and screws for adjusting the jaws, substantially as described.

7. A luggage-carrier comprising a frame having means for securing it to a bicycle and provided with a seat, and clamping-jaws arranged at the seat and projecting above the frame to engage the bottom of a receptacle, said clamping-jaws being pivoted and adapted to be turned down to a position below the top of the frame, substantially as described.

8. A luggage-carrier comprising front and rear clamps, the front clamp being designed to be mounted on the front fork of a bicycle-frame, a luggage-carrier frame connected with the clamps and extending in advance and in rear of the front fork and adapted to receive a bundle or package on both its front and rear portions, said luggage-carrier frame being provided in rear of the front fork with lateral extensions and having similar extensions 21 and 22 located in advance of the front fork, and adjustable clamping-jaws arranged at the extensions 22, substantially as and for the purpose described.

9. A luggage-carrier comprising a front clamp designed to be mounted on the front fork of a bicycle-frame, a luggage-carrier frame having opposite sides secured between their ends to the front clamp, a rear clamp provided with a pair of jaws, and the extensible resilient yoke adjustably secured to the rear ends of the sides of the frame of the luggage-carrier and provided at its top with a substantially U-shaped bend, and having means for adjusting the bend, substantially as described.

10. A luggage-carrier comprising a frame having parallel central portions 20 and provided with an outer looped portion forming extensions, said frame being provided in its inner and outer portions with threaded perforations, radial screws mounted in the perforations, adjustable clamping-jaws mounted on the screws and adapted to be arranged at the inner or outer sides of the outer portions of the frame, and means for securing the frame to a bicycle, substantially as described.

11. A luggage-carrier comprising a frame, means for securing the frame to a bicycle, a lamp-carrier pivotally mounted within the frame at the front thereof and adapted to swing inward and outward, and an adjusting-screw mounted on the frame and engaging the base of the lamp-carrier, substantially as described.

12. A luggage-carrier comprising a frame, a clamp having a loop or keeper, a substantially T-shaped support adapted to be used as a tool and having one of its arms arranged within the loop or keeper and provided with an opening, and a catch mounted on the loop or keeper and engaging the opening, substantially as described.

In testimony that I claim the foregoing as my own I have hereto affixed my signature in the presence of two witnesses.

IRA D. ALDERMAN.

Witnesses:
JOHN H. SIGGERS,
A. W. WELLS.